US 12,405,655 B2

United States Patent
Lobo et al.

(10) Patent No.: US 12,405,655 B2
(45) Date of Patent: Sep. 2, 2025

(54) SYSTEMS AND METHODS FOR REDUCING POWER CONSUMPTION BY MONITORING NETWORK TRAFFIC

(71) Applicant: NetScout Systems, Inc., Westford, MA (US)

(72) Inventors: Danny Lobo, Pleasanton, CA (US); Yuan-Min Ku, Plano, TX (US); Alan Hall, Plano, TX (US); Russell Erickson, Portola Valley, CA (US)

(73) Assignee: NetScout Systems, Inc., Westford, MA (US)

( * ) Notice: Subject to any disclaimer, the term of this patent is extended or adjusted under 35 U.S.C. 154(b) by 77 days.

(21) Appl. No.: 18/494,606

(22) Filed: Oct. 25, 2023

(65) Prior Publication Data
US 2025/0138621 A1   May 1, 2025

(51) Int. Cl.
*G06F 1/324*   (2019.01)
*G06F 1/3209*   (2019.01)
*H04L 41/147*   (2022.01)
*H04L 41/16*   (2022.01)
*H04L 43/0876*   (2022.01)

(52) U.S. Cl.
CPC .......... *G06F 1/324* (2013.01); *H04L 43/0876* (2013.01)

(58) Field of Classification Search
CPC .... G06F 1/324; H04L 43/0876; H04L 41/147
See application file for complete search history.

(56) References Cited

U.S. PATENT DOCUMENTS

| | | | |
|---|---|---|---|
| 2010/0082321 A1* | 4/2010 | Cherkasova | G06F 11/3447 703/22 |
| 2012/0317276 A1* | 12/2012 | Muniraju | H04L 41/14 709/224 |
| 2017/0269667 A1* | 9/2017 | Chen | G06T 1/20 |
| 2018/0335824 A1 | 11/2018 | Macnamara et al. | |
| 2019/0004594 A1 | 1/2019 | Kim et al. | |
| 2019/0272002 A1* | 9/2019 | Seenappa | G06F 1/324 |
| 2022/0206873 A1* | 6/2022 | He | G06F 9/4881 |

FOREIGN PATENT DOCUMENTS

WO   WO-2022/117320   6/2022

OTHER PUBLICATIONS

EP Extended Search Report dated Mar. 7, 2025 in European Patent Application No. 24203541.8.

* cited by examiner

*Primary Examiner* — Jaweed A Abbaszadeh
*Assistant Examiner* — Gayathri Sampath
(74) *Attorney, Agent, or Firm* — Foley & Lardner LLP

(57) ABSTRACT

A method can include monitoring a level of network traffic to a server. The method can include setting a clock rate of one or more cores of a processor of the server based on the monitored level of network traffic.

15 Claims, 6 Drawing Sheets

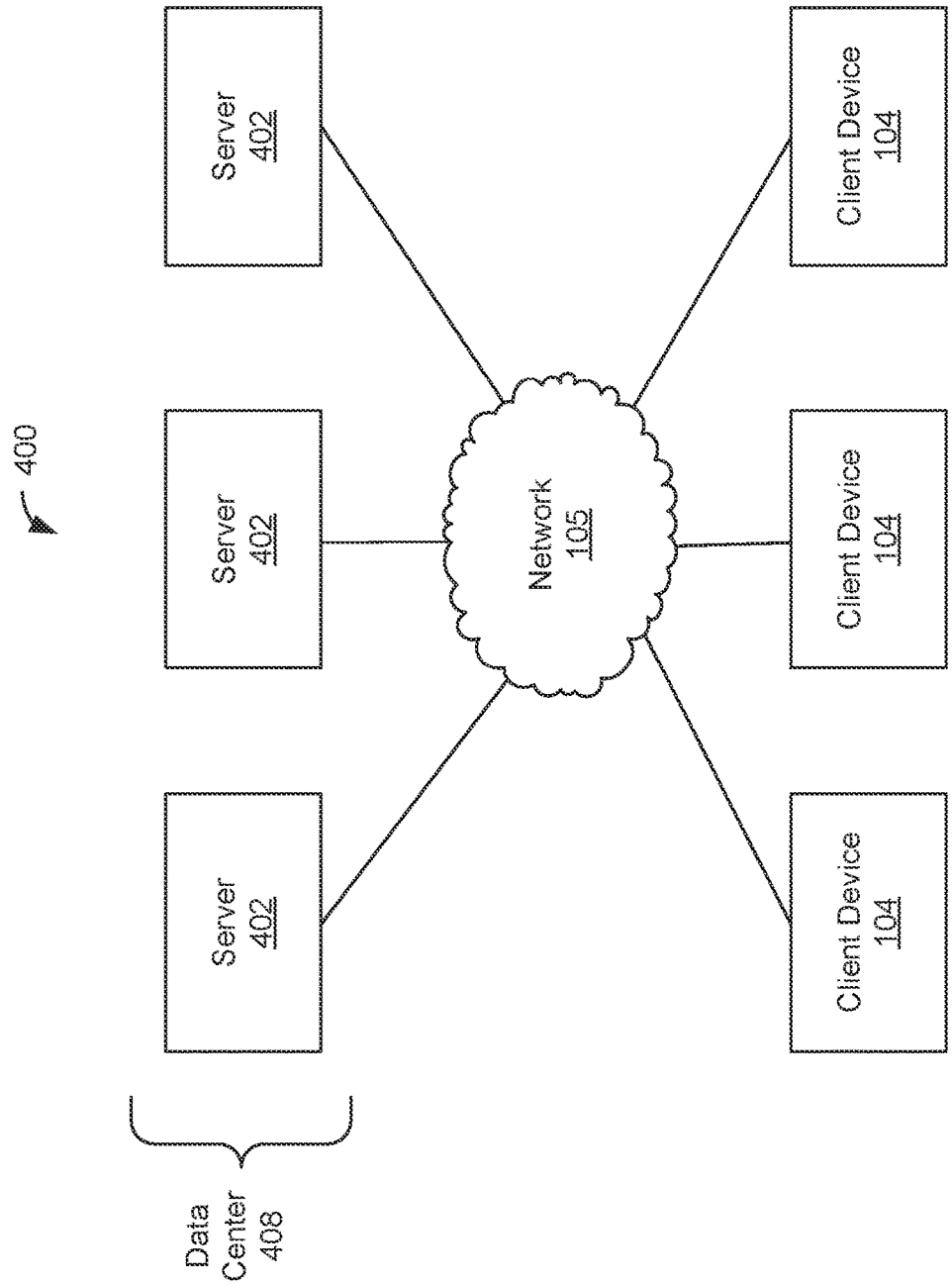

SYSTEMS AND METHODS FOR REDUCING POWER CONSUMPTION BY MONITORING NETWORK TRAFFIC

BACKGROUND

Power consumption of a processor is directly correlated with a clock rate of the processor. The clock rate is a frequency at which a clock generator of the processor generates pulses which are used to synchronize the operations of components of the processor. Appliances that process network traffic generally operate in full-power mode, with a single clock rate.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 4A is a block diagram depicting an implementation of a network environment including a client device in communication with a server device;

DETAILED DESCRIPTION

Figure 1:
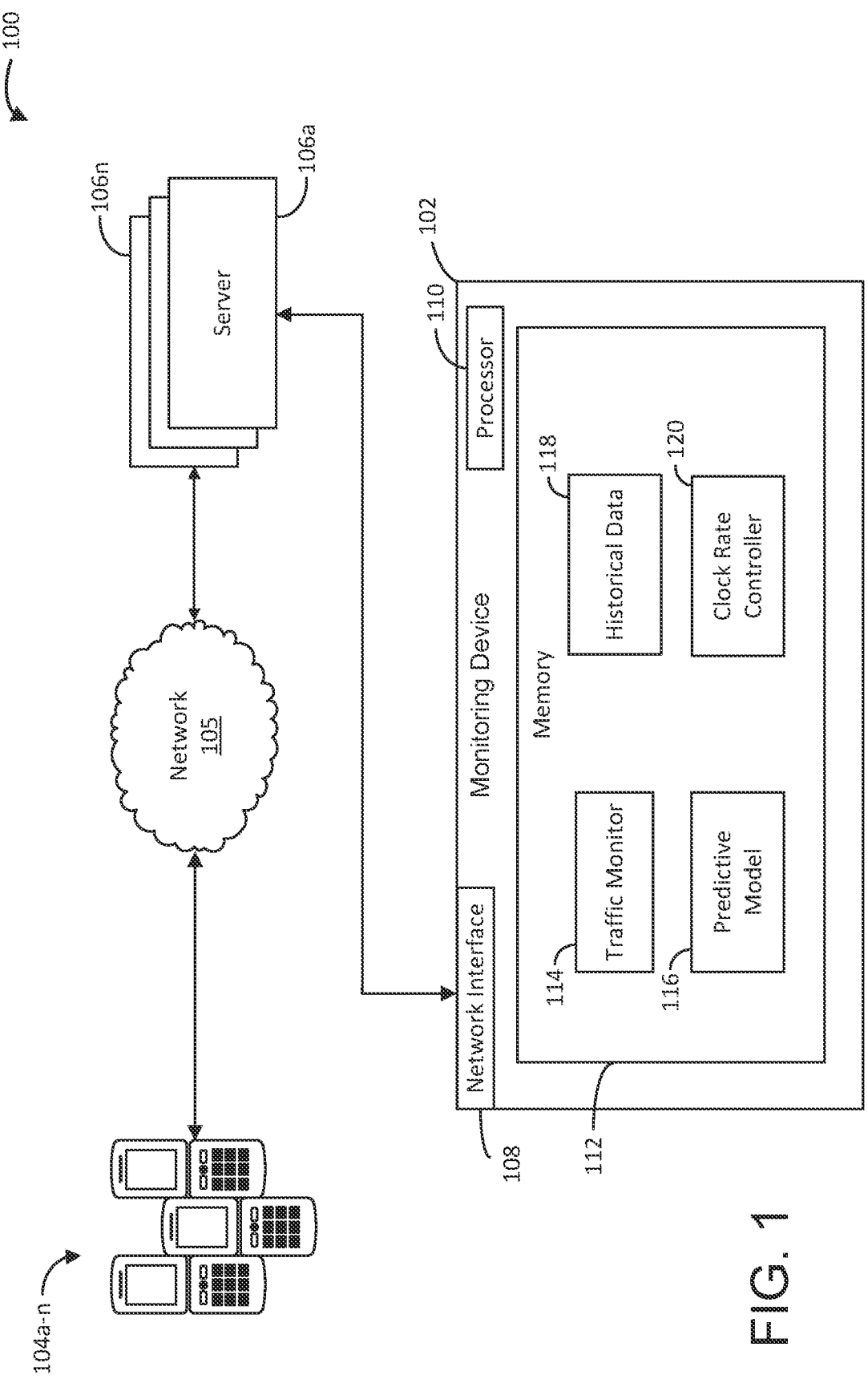
FIG. 1 is an illustration of a computing environment, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As mentioned above, power consumption of a processor is directly correlated with a clock rate of the processor. Appliances that process network traffic generally operate in full-power mode, with a single clock rate. Embodiments discussed herein provide for adjusting the clock rate of one or more cores of one or more processors of a server processing network traffic to reduce a power consumption of the server. Reducing the power consumption of the server can reduce an amount of heat generated by the server, reducing power required for cooling the server. By reducing the power consumption of the server and the power required for cooling the server, the server can operate in a more efficient and environmentally friendly manner.

In some implementations, a network traffic monitor, such as a monitoring device or monitoring software, can monitor a level of network traffic to a server. Based on the level of network traffic, the network traffic monitor can set a clock rate of one or more cores of a processor of the server based on the monitored level of network traffic. The level of network traffic may be used to determine a load, such as a network traffic load or a compute load, on the server. In some implementations, the network traffic monitor can determine the load on the server based on the level of network traffic and capabilities of the server. In an example, the network traffic monitor can determine a percentage utilization of the server based on a maximum level of network traffic the server can handle and a level of network traffic. In some implementations, the network traffic monitor may directly measure the load on the server. The load on the server may be used to infer the level of network traffic to the server. Thus, discussion herein as to managing one or more cores of the server based on the level of network traffic applies equally to managing the one or more cores based on the load on the server, and discussion herein as to managing the one or more cores of the server based on the load on the server applies equally to managing the one or more cores based on the level of network traffic. Managing the one or more cores based on the load on the server has the advantage of being independent of the capabilities of the server. Measuring the level of network traffic may require knowledge of the capabilities of the server, but measuring the load on the server directly may not require knowledge of the capabilities of the server. Measuring the load on the server may include measuring the load on each core of the server. Managing the one or more cores may be based on the load on each respective core.

The network traffic monitor may set the clock rate of the one or more cores based on the level of network traffic by reducing the clock rate based on the level of network traffic being below a predetermined threshold. The network traffic monitor may reduce the clock rate while maintaining a reserve of available processing power on the one or more cores. In an example, the network traffic monitor may reduce the clock rate of the one or more cores by reducing the clock rate of a first core by a first amount based on the level of network traffic being below the predetermined threshold and reducing the clock rate of a second core of the one or more cores by a second amount, less than the first amount, to maintain a reserve of available processing power on the second core. In some implementations, the network traffic monitor may set the clock rate of each core independently and maintain a reserve of available processing power on each core or only on some cores. The reserve of available processing power may vary between cores and may be based on a safety factor for the server, a group of cores, or each core. In this way, a safety buffer is maintained such that the server can handle unexpected spikes in network traffic. The first amount and the second amount may be based on an expected size of traffic spikes and/or a speed at which the clock rate can be increased in response to an increase in network traffic. The network traffic monitor may increase the clock rate based on the level of network traffic being above the predetermined threshold or a second threshold. The network traffic monitor may increase the clock rate based on a buffer of the network driver being filled above a predetermined buffer threshold. The network traffic monitor may reduce the clock rate of a first core of the one or more cores and increase the clock rate of the first core based on demand for a specific function performed by the first core. As an example, the specific function performed by the first core may be at least one of encryption, decryption, compression, decompression, tunneling encapsulation, tunneling de-encapsulation, packet storage to disk, and network firewall. In this way, power may be conserved when the specific function is not needed or when the first core is not needed to perform the specific function.

The network traffic monitor may monitor the level of network traffic to the server by measuring a ratio of user space execution to kernel space execution of a network driver of the server. In some implementations, measuring the ratio of user space execution to kernel space execution of the network driver may include measuring a first ratio of user space execution to kernel space execution of a first network driver of a first core of the one or more cores and measuring a second ratio of user space execution to kernel space execution of a second network driver of a second core of the one or more cores, where setting the clock rate of the one or more cores based on the monitored level of network traffic includes setting the clock rate of the first core and the second core based on a maximum of the first ratio and the second ratio. In some implementations, measuring the ratio of user space execution to kernel space execution of the network driver includes measuring a first ratio of user space execution to kernel space execution of a first network driver of a first core of the one or more cores and measuring a second ratio of user space execution to kernel space execution of a second network driver of a second core of the one or more cores, where setting the clock rate of the one or more cores based on the monitored level of network traffic includes setting the clock rate of the first core based on the first ratio and setting the clock rate of the second core based on the second ratio.

In some implementations, historical data including historical levels of network traffic to the server can be used to train a predictive model. A network traffic monitor, such as a monitoring device or monitoring software, can generate, using the predictive model, a predicted level of network traffic to the server and set a clock rate of one or more cores of a processor of the server based on the predicted level of network traffic.

The network traffic monitor may reduce the clock rate based on the predicted level of network traffic while maintaining a reserve of available processing power on the one or more cores. In an example, setting the clock rate of the one or more cores may include reducing the clock rate of a first core by a first amount based on the predicted level of network traffic being below a predetermined threshold and reducing the clock rate of a second core of the one or more cores by a second amount, less than the first amount, to maintain a reserve of available processing power on the second core. Setting the clock rate of the one or more cores may include reducing the clock rate of each core independently, maintaining a reserve of available processing power on a subset of the one or more cores, to maintain a reserve of available processing power on the server. Setting the clock rate of the one or more cores may include increasing the clock rate based on a buffer of the network driver being filled above a predetermined buffer threshold. Setting the clock rate of the one or more cores may include reducing the clock rate of a first core of the one or more cores and the network traffic monitor may increase the clock rate of the first core based on demand for a specific function performed by the first core. The specific function performed by the first core may include at least one of encryption, decryption, compression, decompression, tunneling encapsulation, tunneling de-encapsulation, packet storage to disk, and network firewall.

The historical levels of network traffic to the server of the historical data may include a ratio of user space execution to kernel space execution of a network driver of the server. The ratio of user space execution to kernel space execution may be a direct measurement of the compute load on the one or more cores and/or the server. The ratio of user space execution to kernel space execution may be used to determine the level of network traffic and/or used to manage the one or more cores. The historical levels of network traffic may include core-level data including a first ratio of user space execution to kernel space execution of a first network driver of a first core of the one or more cores and a second ratio of user space execution to kernel space execution of a second network driver of a second core of the one or more cores, and the historical data on which the machine learning model is trained may include processor-level data including a maximum of the first ratio and the second ratio. The historical levels of network traffic may include core-level data including a first ratio of user space execution to kernel space execution of a first network driver of a first core of the one or more cores and a second ratio of user space execution to kernel space execution of a second network driver of a second core of the one or more cores, and the historical data on which the machine learning model is trained may include the core-level data. The historical data may include at least one trend fitted to the levels of network traffic to the server.

FIG. 1 illustrates an example computing environment 100, in accordance with some embodiments. In brief overview, the system 100 can include a monitoring device 102 that measures network traffic between client devices 104*a-n* (hereinafter client device 104 or client devices 104) and servers 106*a-n* (hereinafter server 106 or servers 106). Client devices 104 can communicate with the servers 106 via the network 105. The servers 106 can each include a set of one or more servers 402, depicted in FIG. 4A, or a data center 408. The monitoring device 102 can measure the network traffic, or a level of network traffic between the client devices 104 and the servers 106 by intercepting data packets transmitted by the servers 106 intended for the client devices 104 and data packets transmitted by the client devices 104 intended for the servers 106, by measuring a fill level of a buffer of a network driver or network interface (NIC) of the servers 106, and/or by measuring a ratio of user space execution and kernel space execution of a poll-mode driver of the servers 106, as discussed herein. The monitoring device 102 can monitor the level of network traffic between the client devices 104 and the servers 106.

The monitoring device 102, the client devices 104, and the servers 106, can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. The network 105 can be or include a 5G network. The network 105 can be used to access information resources such as web pages, websites, domain names, or uniform resource locators that can be presented, output, rendered, or displayed on at least one computing device (e.g., client device 104), such as a laptop, desktop, tablet, personal digital assistant, smartphone, portable computers, or speaker. For example, via the network 105, the client devices 104 can query the servers 106 with domain names or otherwise communicate with the servers 106. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

Each of the monitoring device 102, the client devices 104, and the servers 106 can include or utilize at least one processing unit or other logic device such as programmable logic array engine, or module configured to communicate with one another or other resources or databases. The components of the monitoring device 102, the client devices 104, and/or the servers 106 can be separate components or a single component. The system 100 and its components can include hardware elements, such as one or more processors, logic devices, or circuits.

The monitoring device 102 may include one or more processors that are configured to measure the level of network traffic between the client devices 104 and the servers 106 and/or the load on the servers 106. The monitoring device 102 may include a network interface 108, a processor 110, and/or memory 112. The monitoring device 102 may communicate with any of the client devices 104 and/or the servers 106 via the network interface 108. The processor 110 may be or include an ASIC, one or more FPGAs, a DSP, circuits containing one or more processing components, circuitry for supporting a microprocessor, a group of processing components, or other suitable electronic processing components. In some embodiments, the processor 110 may execute computer code or modules (e.g., executable code, object code, source code, script code, machine code, etc.) stored in the memory 112 to facilitate the operations described herein. The memory 112 may be any volatile or non-volatile computer-readable storage medium capable of storing data or computer code. The monitoring device 102 may be positioned in front of or behind one or more of the servers 106. The monitoring device 102 can monitor the network traffic and/or the level of network traffic sent to and from the servers 106.

The monitoring device 102 may set a clock rate of one or more cores of the servers 106 based on the monitored level of network traffic and/or the load on the server. The monitoring device 102 may set the clock rate based on a predicted level of network traffic and/or predicted server load generated by a predictive model trained using historical data including historical levels of network traffic to the servers 106 and/or historical server loads.

The memory 112 may include a traffic monitor 114, a predictive model 116, historical data 118, and a clock rate controller 120 in some implementations. In some implementations, the predictive model 116 may be part of or stored on a separate device or data structure. In some implementations, the historical data may be part of or stored on a separate device or data structure. The monitoring device 102 may measure the level of network traffic between the client devices 104 and the servers 106. The monitoring device 102 may set the clock rate of the one or more cores of the servers 106 based on the monitored level of network traffic and/or monitored server load and/or the predicted level of network traffic and/or the predicted server load generated by the predictive model 116 trained on the historical data 118.

The traffic monitor 114 may include programmable instructions that, upon execution, cause the processor 110 to receive or measure the level of network traffic between the client devices 104 and the servers 106 and/or the server load. Measuring the level of network traffic and/or the server load may include measuring a number of packets per second, measuring a fill level of a buffer of a NIC or network driver of the servers 106, and/or measuring a user space execution to kernel space execution of a poll-mode driver of the servers 106, as discussed herein. In some implementations, the traffic monitor may store the level of network traffic in the historical data 118.

The predictive model 116 may include programmable instructions that, upon execution, cause the processor 110 to generate a predicted level of network traffic between the client devices 104 and the servers 106 and/or a predicted server load. The predictive model 116 may be a statistical model or a machine learning model. The predictive model 116 may be a machine learning model trained using the historical data 118. In some implementations, the predictive model 116 may be trained by the monitoring device 102 using the historical data 118. In some implementations, the predictive model 116 may be trained by another device or system using the historical data 118 and/or other historical data including network traffic levels. The predictive model may be a recurrent neural network (RNN), such as a long short-term memory (LSTM) network. The predictive model 116 may be a deep RNN. The predictive model 116 may be updated using feedback on results of the predicted level of network traffic to refine future determinations of the predicted level of network traffic. The predictive model 116 may be continually updated using feedback on results of the predicted level of network traffic. The predictive model 116 may be continually updated based on user input and/or the accuracy of the predicted level of network traffic. In some implementations, the predictive model 116 may be updated using an updated training set including instances where the predicted level of network traffic was incorrect. In some implementations, the predictive model 116 may be updated at regular intervals, such as daily, weekly, monthly, etc.

The historical data 118 may include historical levels of network traffic to the server 106. The historical data 118 may include various measurements of network traffic representing the historical levels of network traffic such as packets per second, the buffer fill level, and the ratio of user space execution to kernel space execution, as discussed herein. In some implementations, the historical data 118 may include historical clock rates associated with the historical levels of network traffic. The historical clock rates may be clock rates of the one or more cores set by the clock rate controller 120. The historical clock rates may be associated with the historical levels of network traffic based on the clock rate controller 120 determining the historical clock rates based on the historical levels of network traffic.

The clock rate controller 120 may include programmable instructions that, upon execution, cause the processor 110 to set the clock rate of the one or more cores of the servers 106. The clock rate controller 120 may set the clock rate based on the monitored level of network traffic and/or the predicted level of network traffic, as discussed in greater detail in conjunction with FIGS. 2 and 3.

Figure 2:
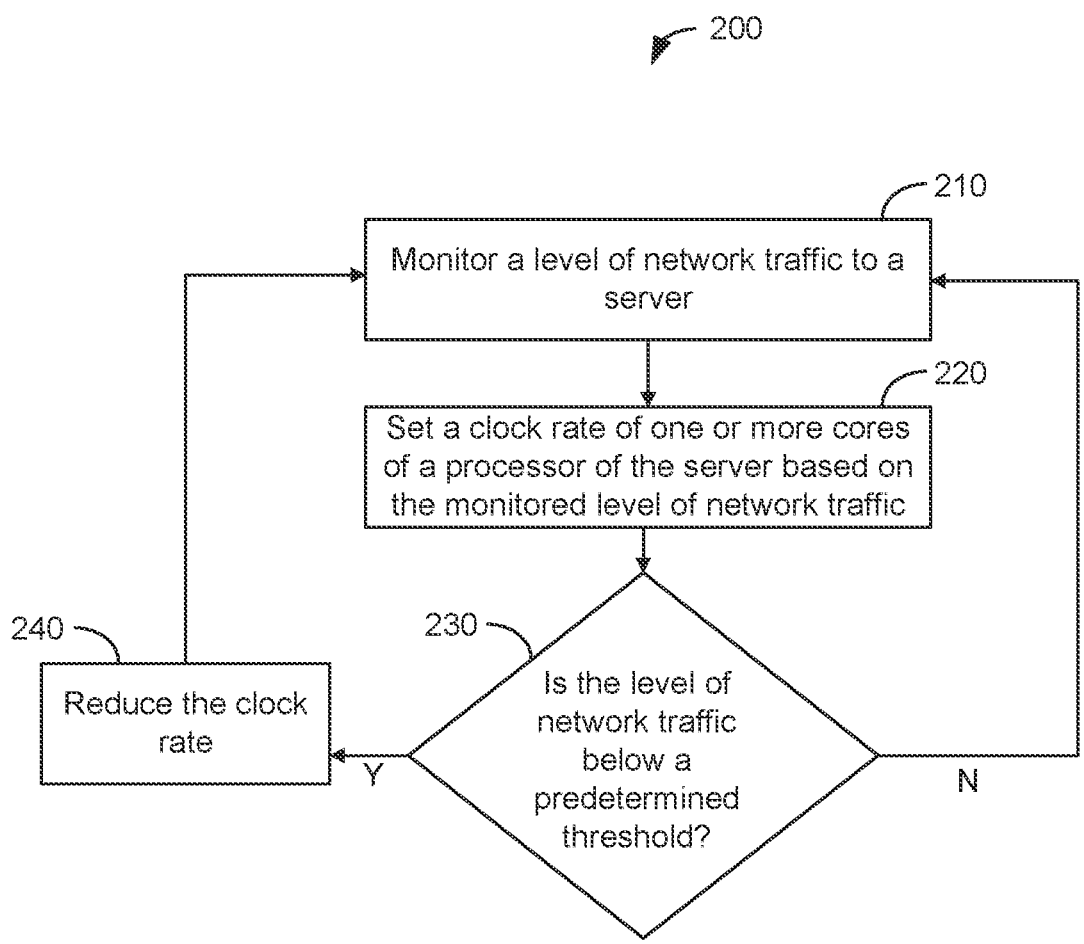
FIG. 2 is an illustration of a method for managing clock rate levels based on monitored network traffic levels, in accordance with an implementation.

FIG. 2 is an illustration of a method 200 for managing clock rate levels based on monitored network traffic levels, in accordance with an implementation. The method 200 can be performed by a data processing system (e.g., a client device, the monitoring device 102, shown and described with reference to FIG. 1, a server system, etc.). The method 200 may include more, fewer, or different operations than shown. The operations may be performed in the order shown, in a different order, and/or concurrently. Performance of the method 200 may enable the data processing system to reduce power consumption of a processor, server, or data center while ensuring that network traffic is processed with minimal packet drops and with minimal latency.

At 210, a level of network traffic to a server is monitored. In some implementations, the level of network traffic is continuously monitored.

In some implementations, monitoring the level of network traffic may include measuring a number of packets per second received. The level of network traffic may be correlated with the number of packets per second received. In some implementations, the level of network traffic depends upon a processing power of the server. The level of network traffic may be based on a number of packets per second the server can process. In an example, a high-powered multi-socket server can process many more packets per second than a small system on a chip (SOC) appliance. Thus, a particular number of packets per second received would correspond to a lower level of network traffic for the high-powered multi-socket server and a higher level of network traffic for the small SOC appliance.

In some implementations, monitoring the level of network traffic may include measuring a buffer fill level of a network interface (NIC) or network driver of the server. The buffer may provide capacity to process short-term variations in the level of network traffic. The buffer fill level may indicate when the level of network traffic exceeds the processing capacity of the server. In an example, the buffer begins to increase when the network traffic begins to exceed the processing capability of the server. A low buffer fill level may indicate that the level of network traffic is at or below the processing capacity of the server.

In some implementations, monitoring the level of network traffic may include measuring a ratio of user space execution to kernel space execution of a poll-mode driver of the server. The poll-mode driver may be the network driver of the server operating in polling mode. User space execution may refer to execution of processes in user space, where applications are generally executed, and kernel space execution may refer to execution of processes in kernel space, where an operating system kernel, kernel extensions, and device drivers are generally executed. When the poll-mode driver is processing a low level of network traffic, the poll-mode driver may perform primarily idle polling and execute primarily in the kernel space. When the poll-mode driver is processing a high level of network traffic, the poll-mode driver may execute primarily in user space. The ratio of user space execution to kernel space execution may be used to determine the load on the CPU. Thus, unlike measuring the raw number of packets per second, measuring the ratio of user space execution to kernel space execution of the poll-mode driver is a general measure of a level of network traffic relative to the processing capability of the server that does not rely upon knowledge of the processing capability of the server. Measuring the ratio of user space execution to kernel space execution may allow for direct measure of the load on the one or more cores and/or the server.

The ratio of user space execution to kernel space execution of the poll-mode driver may be expressed as a percentage, with the percentage being compared to various predetermined percentage thresholds, as discussed herein. In an example, if the poll-mode driver is executing in the user space 70% of the time, the poll-mode driver (and the server) is underutilized, and the clock rate may be decreased. As the percentage of time the poll-mode driver executes in the user space increases, the clock rate can be increased to maintain a peak packet processing rate. The specific percentages used as thresholds may depend upon various configurations, such as increased processor usage to reduce user time. Although the ratio of the execution of the poll-mode driver in the kernel space and the user space is discussed herein, the ratio of execution in the kernel space and the user space for any thread operating in polling mode which is dedicated to processing network traffic may be used to measure the level of network traffic.

At 220, a clock rate of one or more cores of a processor of the server is set based on the monitored level of network traffic.

Setting the clock rate of the one or more cores may include determining, at 230, whether the level of network traffic is below a predetermined threshold.

At 240, responsive to the level of network traffic being below the predetermined threshold, the clock rate is reduced. The clock rate may be reduced by an amount based on the level of network traffic. In some implementations, the clock rate is reduced proportional to the level of network traffic compared to an average level of network traffic for a period of time. The period of time may be a minute, an hour, a day, a month, a year, multiple years, or any time period. In some implementations, the clock rate is reduced proportional to the level of network traffic compared to the predetermine threshold. In an example, the clock rate is reduced to 80% of full power based on the level of network traffic being 80% of the predetermined threshold.

In some implementations, reducing the clock rate of the one or more cores includes reducing the clock rate of a first core by a first amount and reducing the clock rate of a second core by a second amount. The second amount may be less than the first amount. The second amount may be less than the first amount such that the second core maintains a higher clock rate than the first core, providing a safety buffer in the event of unexpected spikes in network traffic. The safety buffer provided by the second core, and thus the second amount by which the clock rate of the second core is reduced, may be based on a speed at which the server can react to unexpected spikes in network traffic. The safety buffer may be determined such that the server can handle an unexpected spike in network traffic using the safety buffer or the overall clock rate of the server including the server buffer and increase the clock rate of the first and second cores without dropping packets or incurring unacceptable latency. The safety buffer may be based on an expected severity of unexpected spikes in network traffic. The safety buffer may be determined such that the safety buffer or the overall clock rate of the server including the server buffer is sufficient to process an unexpected spike in network traffic of the expected severity.

In some implementations, setting the clock rate of the one or more cores based on the level of network traffic includes increasing the clock rate being above the predetermined threshold. The clock rate may be increased to avoid data loss. In an example, the clock rate may be increased, if it has been reduced from full power, based on the level of network traffic rising above the predetermined threshold. In an example, the clock rate may be reduced based on the level of network traffic falling below a first predetermined threshold and the clock rate may be increased based on the level of network traffic rising above a second predetermined threshold. In an example, the first predetermined threshold may be a higher level of network traffic than the second predetermined threshold. In this way, the server may be more reactive, lowering the clock rate as the level of network traffic is falling and raising the clock rate as the level of network traffic is rising. In an example, the first predetermined threshold may be a lower level of network traffic than the second predetermined threshold. In this way, the server may change its clock rate less frequently, providing a space between the first threshold and the second threshold where the clock rate is unchanged.

In some implementations, a clock rate of other components of the server can be reduced. In an example, a clock rate of caches, one or more interconnects between cores, memory controllers, and/or I/O controllers can be reduced. The clock rate of the other components of the server can be reduced when the clock rate of the one or more cores is reduced or separate from the clock rate of the one or more processors. In some implementations, the clock rate of the other components of the server can be reduced proportional to the clock rate of the one or more cores. Reducing the clock rate of the other components of the server can result in reduced power consumption.

Responsive to the level of network traffic being at or above the predetermined threshold, the level of network traffic is monitored at 210. Responsive to increasing or reducing the clock rate, the level of network traffic is monitored at 210. The level of network traffic may be monitored continuously.

In some implementations, setting the clock rate of the one or more cores includes reducing the clock rate of a dedicated core which is dedicated to a specific situation, specific function, or type of packet processing. In an example, the dedicated core may be dedicated to encryption, decryption, compression, decompression, tunneling encapsulation, tunneling de-encapsulation, packet storage to disk, network firewall, or another process. The dedicated core may have its clock rate reduced when its dedicated function is not used or not required. The dedicated core may have its clock rate increased when its dedicated function is used, required, or expected to be used or required.

In some implementations, setting the clock rate of the one or more cores includes powering down the one or more cores such that their clock rate is zero. Similarly, one or more blades of the server can be powered down to set the clock rate of their processor cores to zero. Powering down the one or more cores and/or the one or more blades can result in reduced power consumption. The one or more cores and/or the one or more blades can be powered on at full power or with a reduced clock rate as the level of network traffic necessitates.

In some implementations, measuring the ratio of user space execution to kernel space execution of the poll-mode drive may include measuring a first ratio of user space execution to kernel space execution of a first poll-mode driver of a first core of the one or more cores and measuring a second ratio of user space execution to kernel space execution of a second network driver of a second core of the one or more cores. Setting the clock rate of the one or more cores based on the level of network traffic may include setting the clock rate of the first core and the second core based on a maximum of the first ratio and the second ratio. In this way, the clock rate of the first core and the clock rate of the second core are set based on a busiest of the first core and the second core. The clock rate of the processor of the server may be reduced based on the peak business of the one or more cores of the server. In this way, the clock rate of the one or more cores may be reduced without compromising server performance. Setting the clock rate of the one or more cores based on the level of network traffic may include setting the clock rate of the first core based on the first ratio and setting the clock rate of the second core based on the second ratio. In this way, the clock rate of the one or more cores of the processor of the server may be set with fine-grained control, allowing for optimization of the clock rate based on the level of network traffic.

Figure 3:
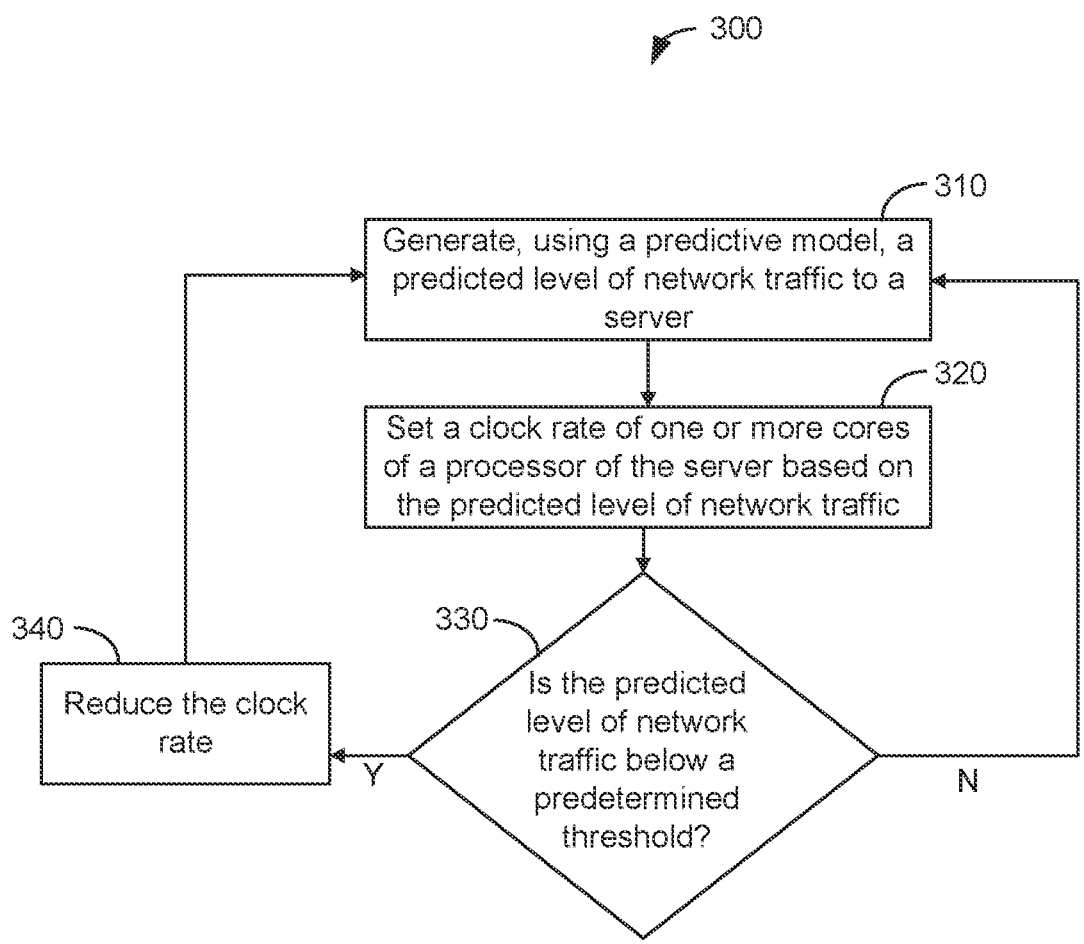
FIG. 3 is an illustration of a method for managing clock rate levels based on predicted network traffic levels, in accordance with an implementation.

FIG. 3 is an illustration of a method 300 for managing clock rate levels based on monitored network traffic levels, in accordance with an implementation. The method 300 can be performed by a data processing system (e.g., a client device, the monitoring device 102, shown and described with reference to FIG. 1, a server system, etc.). The method 300 may include more, fewer, or different operations than shown. The operations may be performed in the order shown, in a different order, and/or concurrently. Performance of the method 300 may enable the data processing system to reduce power consumption of a processor, server, or data center while ensuring that network traffic is processed with minimal packet drops and with minimal latency.

At 310, a predicted level of network traffic to a server is generated using a predictive model. In some implementations, the predictive model may be a statistical model generated using the historical data. In some implementations, the predictive model may be a machine learning model trained using historical data including historical levels of network traffic to the server. The historical data may include one or more measurements of network traffic. The historical data may include time series data including the one or more measurements of network traffic. The historical data may include packets per second, a fill level of a buffer of a network driver or NIC, and/or a ratio of user space execution to kernel space execution of a network driver of the server, as discussed herein. The historical data may represent a periodic variation of the network traffic, otherwise referred to as a seasonality of the network traffic. The machine learning model may be trained using the historic data to model the seasonality of the network traffic. In some implementations, the seasonality may be periodic over one or more time periods. The one or more time periods may include hours, days, weeks, months, and years. By modeling the seasonality of the network traffic, the machine learning model may reduce and increase a clock rate of one or more cores of the server based on the predicted level of network traffic to the server. In this way, power consumption may be reduced relative to reducing the clock rate responsive to the monitored level of network traffic. A smaller safety buffer may be used when reducing the clock rate based on the predicted level of network traffic, as the predicted level of network traffic may account for ramp-up times for increasing the clock rate.

The machine learning model may be a recurrent neural network (RNN), such as a long short-term memory (LSTM) network. The machine learning model may be a deep RNN. The machine learning model may be updated using feedback on results of the predicted level of network traffic to refine future determinations of the predicted level of network traffic. In an example, the machine learning model may be trained using the historical data and generate a first predicted level of network traffic for a first time period. The first predicted level of network traffic and a corresponding actual level of network traffic for the first time period may be added to the historical data. The machine learning model may be updated based on the updated historical data including the first predicted level of network traffic and a corresponding actual level of network traffic for the first time period.

The machine learning model may be trained using a subset of the historical data to balance an accuracy of the machine learning model, a time required to train the machine learning model, and a consumption of processing resources in training the machine learning model. In an example, if data is sampled every 10 seconds for a month for a single thread, more than half a million data samples are sampled. For systems having multiple cores and/or multiple threads, millions of data samples are sampled over the same time period. Training the machine learning model on millions of data samples consumes more computing resources and requires more time than training the machine learning model on fewer data samples. By training the machine learning model using the subset of the historical data, the consumption of processing resources and the time required to train the machine learning model may be reduced.

In an example, the historical data may include data samples from ten cores of a server. The machine learning model may be trained using the historical data including the data samples from all ten cores. The subset of the historical data may include, for each time period, a maximum of the network traffic processed by the ten cores. The time period may be equal to the data sampling rate or larger than the data sampling rate. In this way, the subset of the historical data is ten times smaller than the historical data for each time period. In an example, the subset of the historical data may include only the maximum network traffic level across all cores of a processor such that the machine learning model is trained on processor-level network traffic data.

The historical data may be simplified to reduce the consumption of processing resources and the time required to train the machine learning model. The historical data may be simplified by reducing the variation and noise in the data samples. In some implementations, the historical data may be simplified to include one or more trends fitted to the levels of network traffic to the server. In an example, the historical data is simplified to replace data samples for a time period with a trend fitted to the data samples. The time period may be an hour, a day, a month, or longer. In an example, the data samples for a day are replaced in the historical data with a trend fitted to the data samples for the day. The machine learning model may be trained on the historical data including the trend to reduce a consumption of computing resources and a time required to train the machine learning model.

At 320, a clock rate of one or more cores of a processor of the server is set based on the predicted level of network traffic. Setting the clock rate may include increasing or reducing the clock rate of the one or more cores, as discussed herein in conjunction with FIG. 2. For example, the clock rate may be increased or reduced based on the predicted level of network traffic being above or below one or more predetermined thresholds, as discussed in conjunction with the monitored level of network traffic in FIG. 2.

In some implementations, setting the clock rate of the one or more cores is based on determining, at 330, whether the predicted level of network traffic is below a predetermined threshold.

In some implementations, responsive to the predicted level of network traffic being below the predetermined threshold, the clock rate is reduced at 340. In some implementations, setting the clock rate of the one or more cores includes providing a safety margin. The safety margin may be provided by reducing the clock rate of a first core of the one or more cores by a first amount and reducing the clock rate of a second core of the one or more cores by a second amount, less than the first amount, to maintain a reserve of available processing power on the second core. The safety margin may be provided by independently setting the clock rate of the one or more cores and maintaining a reserve of processing power on a subset of the one or more cores. In an example, each core has an associated safety factor of five percent and maintains a corresponding reserve of processing power when its clock rate is lowered. In an example, the server has a safety factor of five percent and a cumulative safety factor of five percent is maintained across the one or more cores when their clock rate is lowered. The reserve of available processing power serves as the safety buffer for handling unexpected or unpredicted spikes in network traffic.

In some implementations, the clock rate may be increased based on a buffer of a network driver or NIC of the server being filled above a predetermined buffer threshold. A buffer fill level may indicate that a current clock rate is insufficient to handle the level of network traffic. The clock rate may be increased responsive to the level of network traffic. The predictive model may be updated based on the increase of the clock rate and/or the surpassing of the predetermined buffer threshold.

In some implementations, setting the clock rate of the one or more cores includes reducing the clock rate of a dedicated core which is dedicated to a specific situation, specific function, or type of packet processing. In an example, the dedicated core may be dedicated to encryption, decryption, compression, decompression, tunneling encapsulation, tunneling de-encapsulation, packet storage to disk, network firewall, or another process. The dedicated core may have its clock rate reduced when its dedicated function is not used or not required. The dedicated core may have its clock rate increased when its dedicated function is used, required, or expected to be used or required.

Responsive to the predicted level of network traffic being at or above the predetermined threshold, the predictive model is used to generate the predicted level of network traffic at 310. Responsive to increasing or reducing the clock rate, the predictive model is used to generate the predicted level of network traffic at 310. The predictive model may be used to continuously generate the predicted level of network traffic.

Methods, processes, and mechanisms for adjusting the clock rate in response to the level of network traffic as discussed in conjunction with FIG. 2 may equally be applied to the discussion of FIG. 3. The clock rate may be set based on the predicted level of network traffic, and adjusted based on current conditions.

FIG. 4A depicts an example network environment that can be used in connection with the methods and systems described herein. In brief overview, the network environment 400 includes the devices 104 (also generally referred to as clients, client node, client machines, client computers, client computing devices, endpoints, or endpoint nodes) of FIG. 1 in communication with one or more servers 402 (also generally referred to as servers, nodes, or remote machine) via the network 105 of FIG. 1. In some embodiments, a client device 104 has the capacity to function as both a client node seeking access to resources provided by a server and as a server providing access to hosted resources for other client devices 104.

Although FIG. 4A shows a network 105 between the client devices 104 and the servers 402, the client devices 104 and the servers 402 can be on the same network 105. In embodiments, there are multiple networks 105 between the client devices 104 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPV6), or the link layer. The network 105 can be a type of a broadcast network, a telecommunications network, a data communication network, or a computer network.

The network environment 400 can include multiple, logically grouped servers 402. The logical group of servers can be referred to as a data center 404 (or server farm or machine farm). In embodiments, the servers 402 can be geographically dispersed. The data center 404 can be administered as a single entity or different entities. The data center 404 can include multiple data centers 404 that can be geographically dispersed. The servers 402 within each data center 404 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 404 do not need to be physically proximate to another server 402 in the same machine farm 404. Thus, the group of servers 402 logically grouped as a data center 404 can be interconnected using a network. Management of the data center 404 can be de-centralized. For example, one or more servers 402 can include components, subsystems and modules to support one or more management services for the data center 404.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
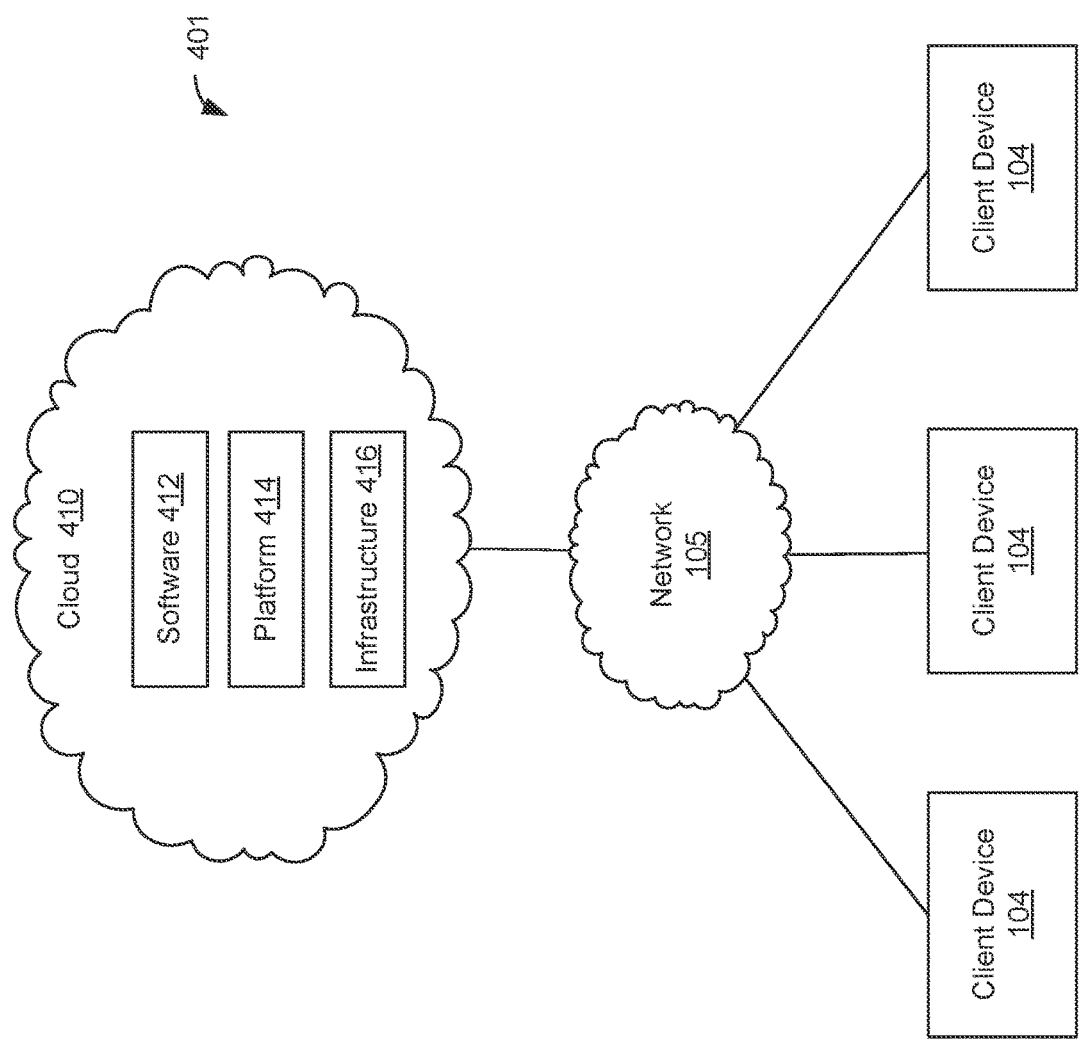
FIG. 4B is a block diagram depicting a cloud computing environment including a client device in communication with cloud service providers.

FIG. 4B illustrates an example cloud computing environment. A cloud computing environment 401 can provide the client device 104 with one or more resources provided by a network environment. The cloud computing environment 401 can include one or more client devices 104, in communication with the cloud 410 over the network 105. Client devices 104 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back end platforms, e.g., servers 402, storage, and/or server farms or data centers.

The cloud 410 can be public, private, or hybrid. Public clouds can include public servers 402 that are maintained by third parties to the client devices 104 or the owners of the clients. The servers 402 can be located off-site in remote geographical locations as disclosed above or otherwise. Public clouds can be connected to the servers 402 over a public network. Private clouds can include private servers 402 that are physically maintained by client devices 104 or owners of clients. Private clouds can be connected to the servers 402 over a private network 105. Hybrid clouds 404 can include both the private and public networks 105 and servers 402.

The cloud 410 can also include a cloud-based delivery, e.g. Software as a Service (Saas) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 104 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 104 and server 402 can be deployed as and/or executed on any type and form of computing device, e.g. a computer, network device or appliance capable of communicating on any type and form of network and performing the operations described herein.

Figure 4C:
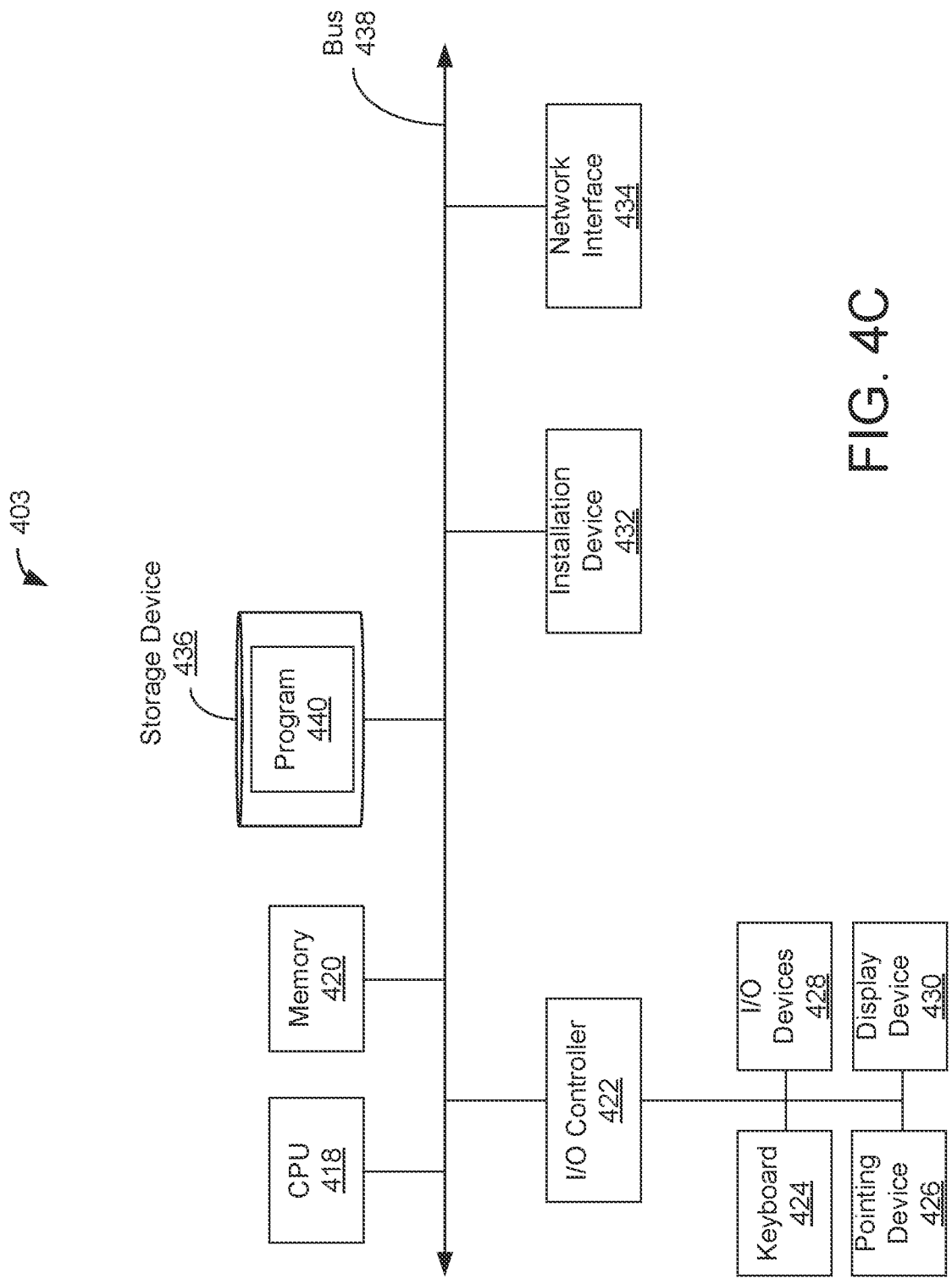
FIG. 4C is a block diagram depicting an implementation of a computing device that can be used in connection with the system depicted in FIGS. 1, 4A, and 4B and the methods depicted in FIGS. 2 and 3.

FIG. 4C depicts block diagrams of a computing device 403 useful for practicing embodiments discussed herein. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g. a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, 2, or 3. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 104 may not require a non-volatile storage device 436 and can be thin clients or zero client devices 104. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 402.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 402.11a/b/g/n/ac CDMA, GSM, WiMax and direct asynchronous connections). The computing device 403 can communicate with other computing devices 403 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of the servers 106, 402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output.

The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer-implemented method comprising:
   monitoring a level of network traffic to a server including measuring a ratio of user space execution to kernel space execution of a network driver of the server by:
      measuring a first ratio of user space execution to kernel space execution of a first network driver of a first core of the one or more cores; and
      measuring a second ratio of user space execution to kernel space execution of a second network driver of a second core of the one or more cores; and
   setting a clock rate of one or more cores of a processor of the server based on the monitored level of network traffic,
   wherein setting the clock rate of the one or more cores based on the monitored level of network traffic comprises setting the clock rate of the first core based on the first ratio and setting the clock rate of the second core based on the second ratio.

2. The computer-implemented method of claim 1, wherein setting the clock rate of the one or more cores based on the level of network traffic comprises reducing the clock rate based on the level of network traffic being below a predetermined threshold.

3. The computer-implemented method of claim 2, wherein reducing the clock rate includes maintaining a reserve of available processing power on the one or more cores.

4. The computer-implemented method of claim 2, wherein setting the clock rate of the one or more cores based on the level of network traffic further comprises increasing the clock rate based on the level of network traffic being above the predetermined threshold.

5. The computer-implemented method of claim 2, further comprising increasing the clock rate based on a buffer of a network driver of the server being filled above a predetermined buffer threshold, wherein the buffer provides capacity for short-term traffic variations and indicates when traffic exceeds processing capacity.

6. The computer-implemented method of claim 1, wherein setting the clock rate of the one or more cores comprises reducing the clock rate of a first core of the one or more cores, the method further comprising increasing clock rate of the first core based on demand for a specific function performed by the first core.

7. The computer-implemented method of claim 6, wherein the specific function performed by the first core includes at least one of encryption, decryption, compression, decompression, tunneling encapsulation, tunneling de-encapsulation, packet storage to disk, and network firewall.

8. A computer-implemented method comprising:
   monitoring a level of network traffic to a server including measuring a ratio of user space execution to kernel space execution of a network driver of the server by:
      measuring a first ratio of user space execution to kernel space execution of a first network driver of a first core of the one or more cores; and
      measuring a second ratio of user space execution to kernel space execution of a second network driver of a second core of the one or more cores; and
   setting a clock rate of one or more cores of a processor of the server based on the monitored level of network traffic,
   wherein setting the clock rate of the one or more cores based on the monitored level of network traffic comprises setting the clock rate of the first core and the second core based on a maximum of the first ratio and the second ratio.

9. A computer-implemented method comprising:
   generating, using a predictive model, a predicted level of network traffic to a server, wherein the predictive model is a machine learning model trained using historical data including historical levels of network traffic to the server and a ratio of user space execution to kernel space execution of a network driver of the server; and
   setting a clock rate of one or more cores of a processor of the server based on the predicted level of network traffic,
   wherein the historical levels of network traffic include core-level data including a first ratio of user space execution to kernel space execution of a first network driver of a first core of the one or more cores and a second ratio of user space execution to kernel space execution of a second network driver of a second core of the one or more cores, and wherein the historical data on which the machine learning model is trained includes the core-level data.

10. The computer-implemented method of claim 9, wherein reducing the clock rate includes maintaining a reserve of available processing power on the one or more cores.

11. The computer-implemented method of claim 9, wherein setting the clock rate of the one or more cores comprises increasing the clock rate based on a buffer of a network driver of the server being filled above a predetermined buffer threshold, wherein the buffer provides capacity for short-term traffic variations and indicates when traffic exceeds processing capacity.

12. The computer-implemented method of claim 9, wherein setting the clock rate of the one or more cores comprises reducing the clock rate of a first core of the one or more cores, the method further comprising increasing the clock rate of the first core based on demand for a specific function performed by the first core.

13. The computer-implemented method of claim 12, wherein the specific function performed by the first core includes at least one of encryption, decryption, compression, decompression, tunneling encapsulation, tunneling de-encapsulation, packet storage to disk, and network firewall.

14. The computer-implemented method of claim 9, wherein the historical data on which the machine learning model is trained includes processor-level data comprising a maximum of the first ratio and the second ratio.

15. The computer-implemented method of claim 1, wherein the historical data includes at least one trend fitted to the levels of network traffic to the server.

* * * * *